Figure 1:
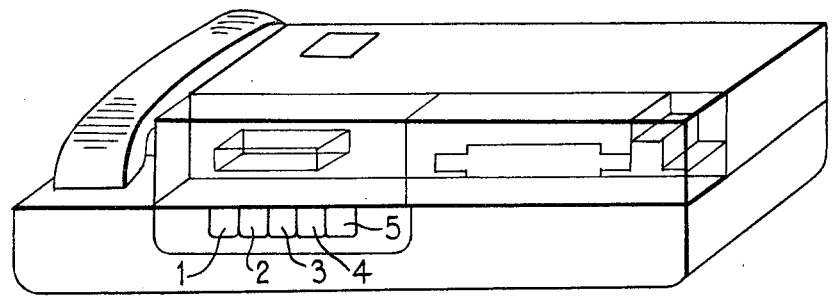

United States Patent [19]

Imgegnoli et al.

[11] 4,302,630
[45] Nov. 24, 1981

[54] TELEPHONIC ANSWERING DEVICE

[75] Inventors: Alessandro Imgegnoli, Milan; Corona Ennio, Piacenza, both of Italy

[73] Assignee: International Standard Electric Corporation, New York, N.Y.

[21] Appl. No.: 94,123

[22] Filed: Nov. 14, 1979

[30] Foreign Application Priority Data

Feb. 1, 1979 [IT] Italy ............................. 19770 A/79

[51] Int. Cl.³ ........................................ H04M 1/64
[52] U.S. Cl. ................................. 179/6.07; 179/6.14
[58] Field of Search ............ 179/6 E, 100.1 VC, 6.07, 179/6.13, 6.14

[56] References Cited
U.S. PATENT DOCUMENTS 2,553,410  5/1951  Handschin ................ 179/100.1 VC
3,736,380  5/1973  Shadd et al. ..................... 179/6 E
3,836,380  9/1974  Kramer ............................... 117/6
3,842,209  10/1974 Foresta et al. ..................... 179/6 E
4,198,549  4/1980  Titus .................................. 179/6 E Primary Examiner—Aristotelis M. Psitos
Attorney, Agent, or Firm—John T. O'Halloran

[57] ABSTRACT

A telephonic answering device effective to operate in a plurality of modes comprises a display unit effective to provide a visual indication of the operating modes and/or possible malfunctions of the telephonic answering device, and a microprocessor driving the display unit and effective to discriminate between effective and noneffective telephonic calls to rewind the message tape, in the case of a noneffective call, substantially to the point corresponding to the begin of said noneffective call.

5 Claims, 9 Drawing Figures

TELEPHONIC ANSWERING DEVICE

The present invention relates to improvements in/or related to the telephonic answering devices or apparatus in general.

As it is known, a telephonic answering device is an apparatus which, as associated to a telephonic line, is able of recording, the user being absent, arriving calls for a successive play back of the arrived calls by the user.

These telephonic answering devices may be essentially classified in two types, depending on the time assigned to the messages by the calling parties, that is "fixed-time" telephonic answering devices, and "not-limited time" telephonic answering devices.

A telephonic answering device, both of the fixed time type and of the "not-limited" time type, has generally the possibility of recording an announcement, that is an information to be transmitted to the calling party and which is really transmitted after the dialling by the calling party of the number of the telephone therewith the telephonic answering device is associated. More specifically, in the fixed time telephonic answering devices, in the announcement is generally included, in addition to various information, also an indication of the time at disposal of the calling party for the recording of the message and an indication that the message has really been recorded.

In the telephonic answering devices of the not-limited time type, said time obviously depending on the apparatus recording capability ranging from tens of minutes to some hours, is not present, in the announcement, an indication of the time at disposal of the calling party and the apparatus stops by itself as predetermined telephonic conditions occur such as, for example, a pause by the calling party longer than a predetermined second number, or upon the detecting of exchange tones or polarity reversals or line transients.

The known telephonic answering devices are not fully satisfactory in particular due to the fact that the operation and/or possible malfunctions thereof are not directly controllable, in the time, by the user. In addition, the known telephonic answering devices are not truly reliable, that is there is a possibility of errors.

With the development of the electronic technique and in particular of the so-called microprocessors, the apparatuses based thereon, and also the telephonic answering devices, have been greatly improved.

For example, in an Italian copending Patent Application No. 19343-A/78 filed 1978 in the name of the same Applicant has been described a telephonic answering device effective to provide the user, by means of an electronic desplay, with a direct indication of the operation and/or possible malfunction states of the telephonic answering device itself. More specifically, in the aforesaid Italian Patent copending Application in the name of the same Applicant of the present invention, has been described a telephonic answering device effective to operate according to a plurality of modes, including a multeplicity of push-buttons having associated a corresponding multiplicity of electrical contacts and including furthermore a display unit of the seven-segment and decimal point elements, said seven-segment and decimal point elements being individually energizable and desenergizable for respectively lightening or switching on and switching off by driving circuit means effective to be driven by said multiplicity of electrical contacts of said push-buttons to cause predetermined said seven-segment elements to switch on and off to visually indicated, by predetermined switching on and off states of said seven-segment elements, the operation mode of said telephonic answering device and possible malfunctions thereof. Thus, the telephonic answering device of said copending patent Application has eliminated many problems related to the reliability since, owing to a direct type of visual display, the user of said telephonic answering device is able of determining, in the time, the operation mode and/or possible malfunctions thereof.

Are also known telephonic answering devices effective to be remotely driven or controlled by the user, on a conventional telephonic line, for transmitting, to said user, possible received messages.

One of these remotely controllable telephonic answering devices has been described in the U.S. Pat. No. 3,736,380 granted on May 29, 1973 to Shadd et. al. The telephonic answering device illustrated in this Patent provides for a plurality of code switching elements effective to be selectively driven between positions responsive to acoustical or voice signals and silence intervals in order to allow for the remotely calling user to extablish a voice arbitrary code sequence to trigger playback means associated to the telephonic answering device itself. Are provided relay means effective to distriminate betweeen effective or true codes and false codes, in order to enable or disable said playback means upon receiving correct or not correct code signals, respectively, during the code receiving intervals as predetermined by cam means associated to the telephonic answering device. More specifically, in the telephonic answering device of said U.S. patent, in order to trigger the remote call controllable operation, the user has to dial the number of his telephonic answering device, in the conventional way but, in this case, immediately after having heard the first tone or beeep sent by the telephonic answering device, the user has to say a predetermined code word. This word predisposes or presets the switches associated to the telephonic answering device for down-counting the code. This down-counting of the code is indicated by tones or beeps and/or words. In particular, the user will hear predetermined tones. In order to complete the code for the remotely controllable playback, the user has moreover to say again said word immediately after a beep, corresponding to a pressed push-button (the user has to remain in silence for those regions in which are not present pressed push-buttons). Upon completing the code, in the telephonic answering device of the aforesaid U.S. patent, is possible to record a message before the playback. Immediately after having heard a predetermined code region, or zone, the calling party, or user, has to count, in silence, a predetermined number sequence at the end of which the user will be able of beginning to speak and a short message will be recorded on the message cartridge before the playback. Upon obtaining the complete code, the user will hear all the recorded messages. At the end of said messages, the answering device will ask: "Do you want to erase?"; if the user desires to erase the messages and recover the telephonic answering device for new messages, he has to say again said word, immediately after the request and/or the beep tone. If the code word has been started in a correct way, then the erasing step is carried out and the user will hear "erased". On the contrary, if the user does not say the code words or if he does not say said word in a proper way, he will hear "not erased" and in this way he will know that on the message cassette are yet present the messages. As it should be clear, this way for remotely controlling the telephonic answering device of the aforesaid U.S. patent is rather intricate: in particular, the recognizing code is rather intricate and imposes obliged passages; in fact compulsorily the user has to respond with a certain word, and compulsorily the user has to decide, before hearing the messages, if to clear or not the counter. In other words, in this vocal code, the times are fixed, which involves for the user drawbacks which should be obvious to those skilled in the art.

In addition, in the aforesaid U.S. patent for the remote driving is used an intricate cam mechanism which, in addition to be of scarcely reliable operation, causes said telephonic answering device to be encumbering.

The main task of the present invention is to provide a telephonic answering device, driven by a microprocessor, which, while using an alphanumeric display for indicating the operating states and/or possible malfunctions thereof, as the telephonic answering device of the aforesaid Italian copending application, is structurally and operatively substantially different due to the presence of basic features underlying the invention and specifically studied for satisfying specific commercial needs among which, in particular, the possibility of a remote driving, by the user of said telephonic answering device and an improved efficiency associated to a further reducing of the use costs.

Within said task, and considered the stated commercial needs, the main object of the present invention is to provide a telephonic answering device controlled by a microprocessor, allowing for a direct conversation with the user to be performed by an alphanumeric display effective to communicate an information series related both to the operating state and anomalous states, which telephonic answering device in the meanwhile is effective to be remotely driven by the user, by means of a conventional telephonic line and flexible codes not requiring obliged passages, to transmit to the user the possible received messages.

Another specific object of the present invention is to provide a telephonic answering device, including an alpha-numerical display, which is able of recording only the true received calls and recovering the tape in the case in which the caller, due to any reasons, does not transmit a message.

Another specific object of the present invention is to provide a telephonic answering device effective to give, in any times and for any tape speeds, either during the high speed winding up step, high speed rewinding or normal operating, a correct information related to the tape position with tolerances within a very narrow range.

Another specific object of the present invention is to provide a telephonic answering device effective to have, even in the case of errors or failing of the message cassette, a reduced operation on the telephonic line such as, for example, effective to emit an announcement without requesting the calling party to leave recordings.

Another specific object of the present invention is to provide a telephonic answering device which is able of beginning the recording from any points of the message cassette.

Another object of the present invention is to provide a telephonic answering device which is able of not to automatically exclude from the telephonic line at the end of the message cassette but which is able of responding by a different announcement not requesting the calling party to leave or record messages.

Yet another object of the present invention is to provide a telephonic answering device which, in the case of a failing of the electrical supply network, does not exclude from the telephonic line but is able of operating again, as the electrical current is recovered, even if with reduced performance, in such a way as to preserve the received messages and the remotely driving possibility by the user.

Yet another object of the present invention is to provide a telephonic answering device with the possibility of protecting the messages from possible unauthorized listening by others.

The aforesaid and other objects, which will become more apparent thereinbelow, are achieved by a telephonic answering device, effective to operate according to a plurality of modes, comprising a push-button assembly, including:

a multiplicity of push-buttons, movable between an inoperative position and an operative position for selecting desired operating modes of said plurality of operating modes of said telephonic answering device, to said multiplicity of push-buttons being operatively associated a corresponding multiplicity of electrical contacts;

tape announcement and message recording means, respectively suitable for recording announcements and messages and respective motor means for said tape recording means, said motor means being of the reversible type and being effective to drive said tape recording means in either of two movement directions;

a display unit effective to provide a visual indication of the operation modes and/or malfunctions of said telephonic answering device;

characterized in that it comprises a microprocessor unit operatively connected to said display unit for driving said display unit in such a way as to provide said indication of the operating modes and/or malfunctions of said telephonic answering device; and in that, in the message receiving operating mode of said telephonic answering device, said microprocessor unit is effective to discriminate between effective telephonic calls and non effective telephonic calls in such a way as to drive, in the case of non effective telephonic calls, said motor means of said tape message recording means to cause said message recording means to re-wind substantially as far as the point corresponding to the begin of the receiving of said non-effective call.

Figure 1A:
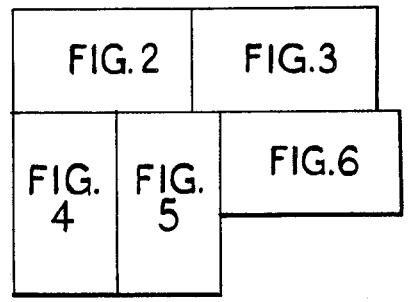
Figure 8:
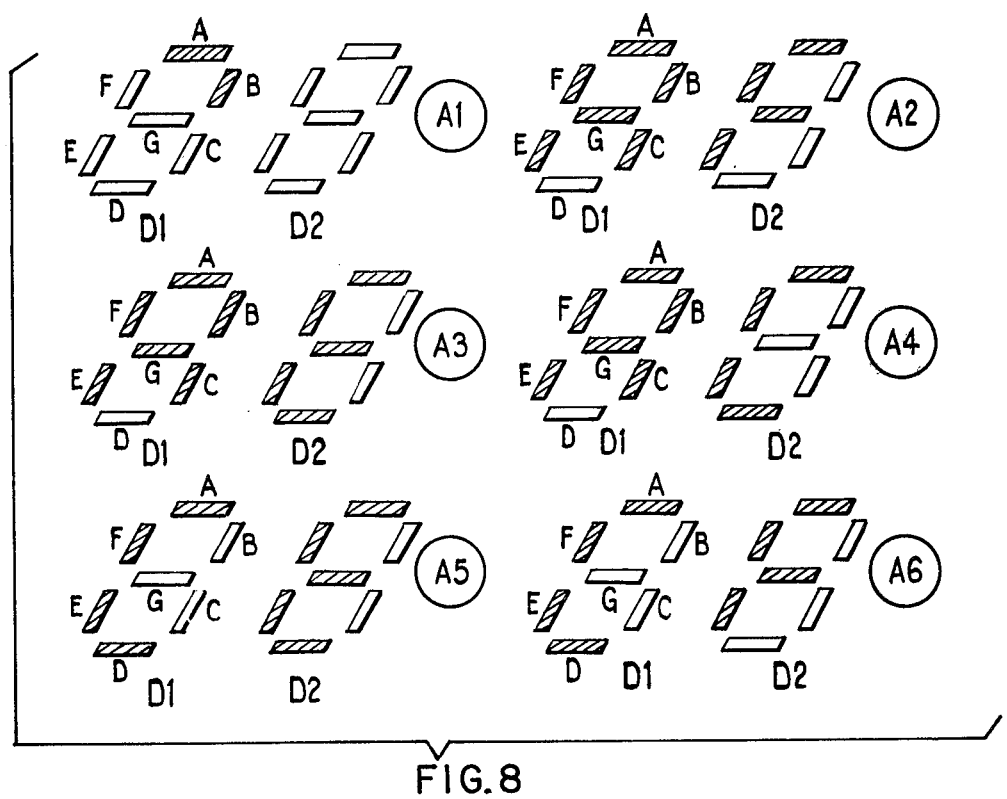
Figure 2:
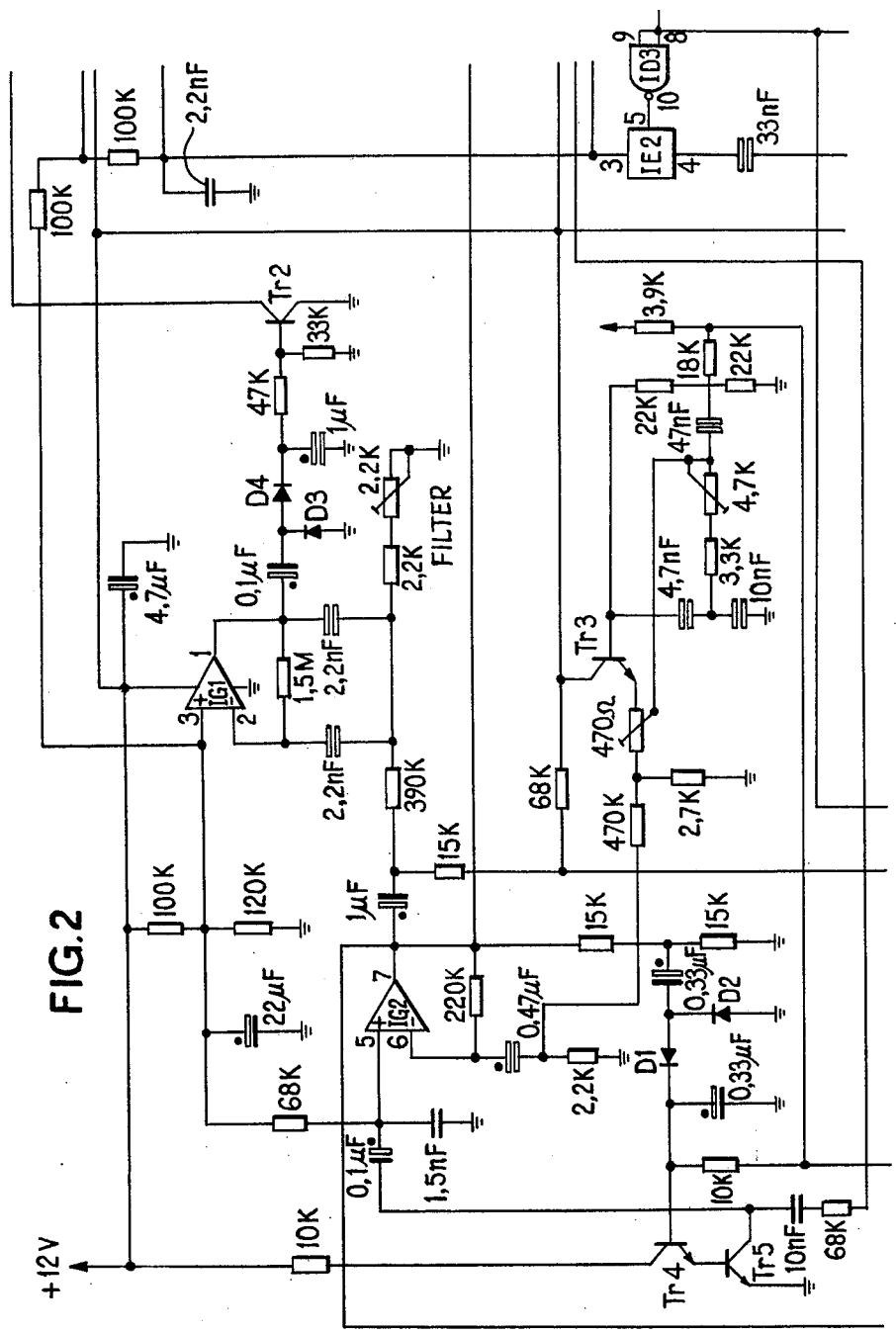
Figure 3:
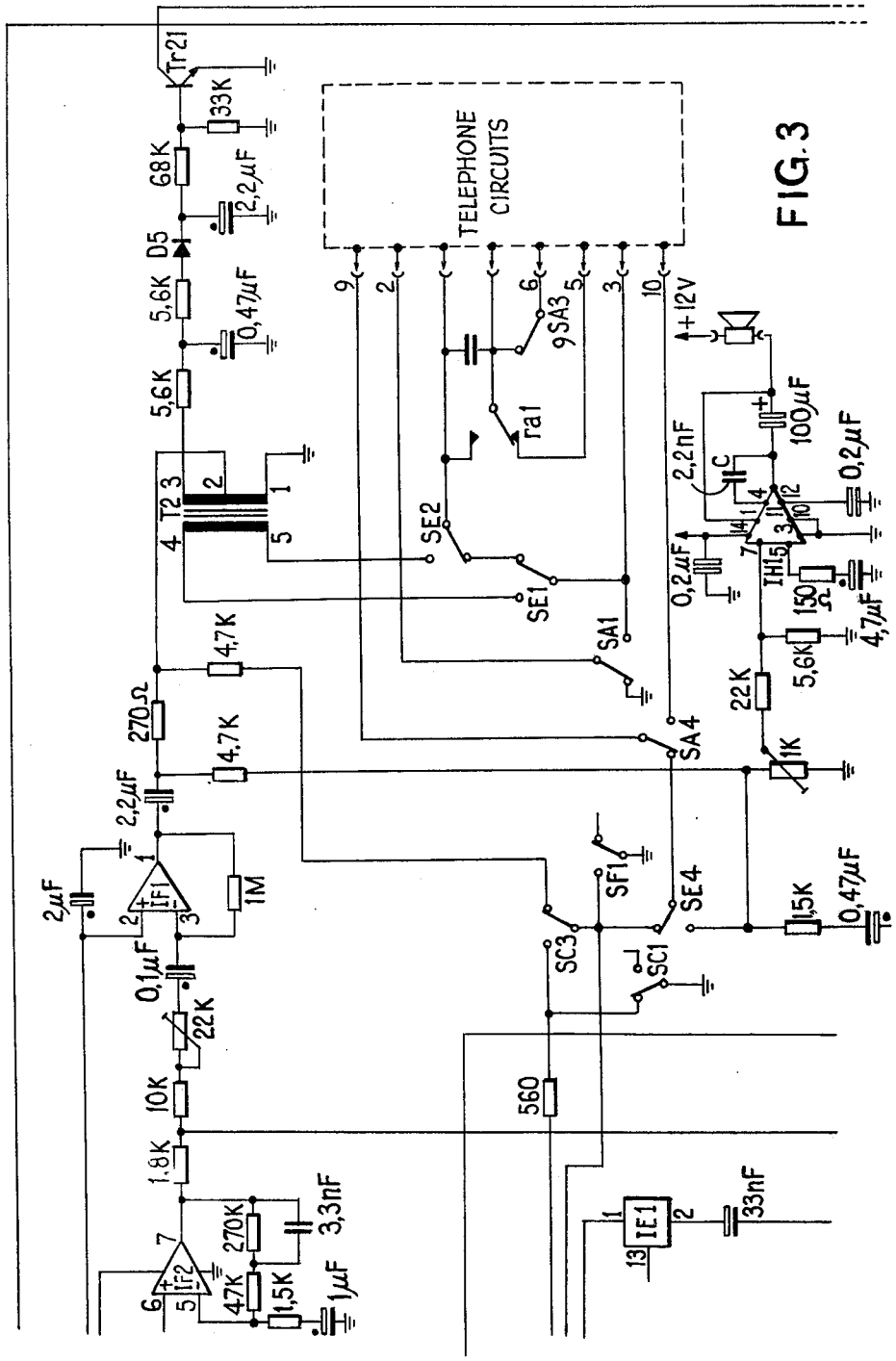
Figure 4:
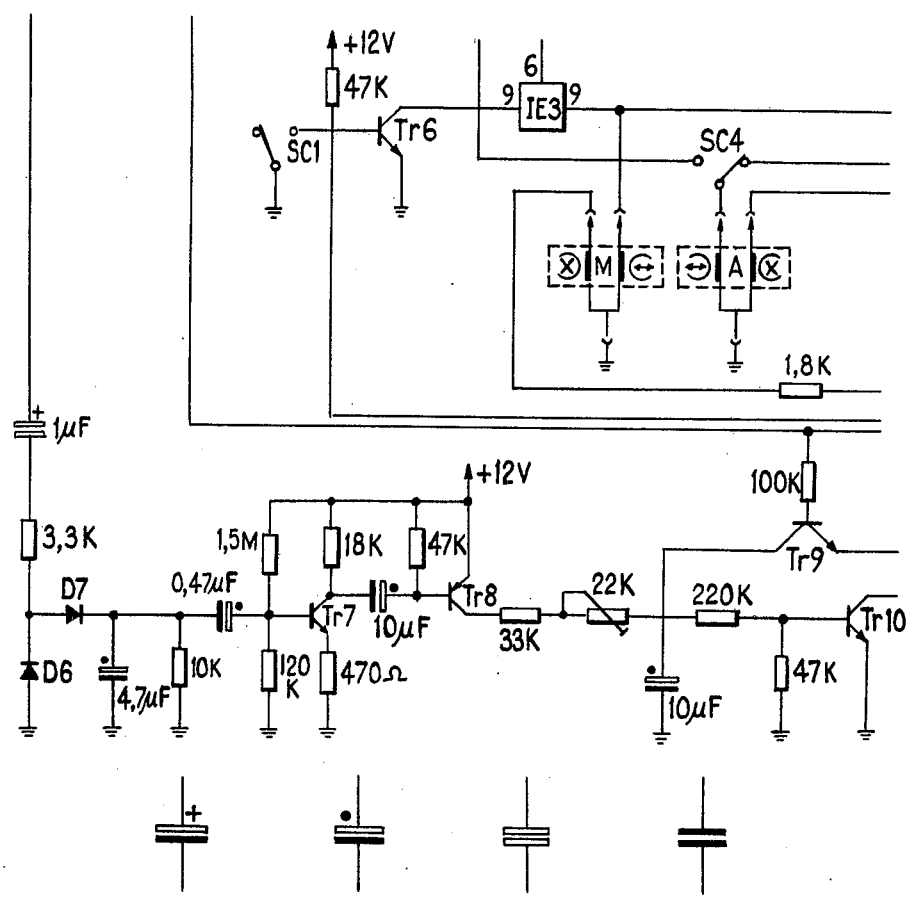
Figure 7:
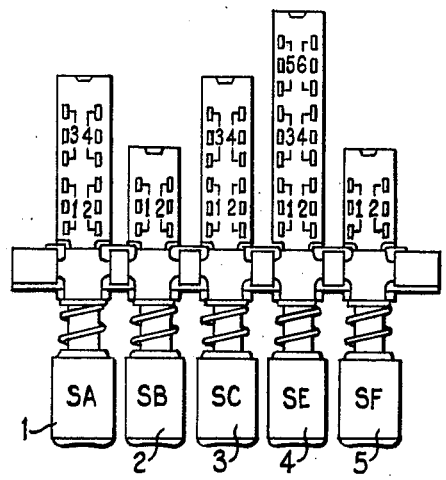
Figure 5:
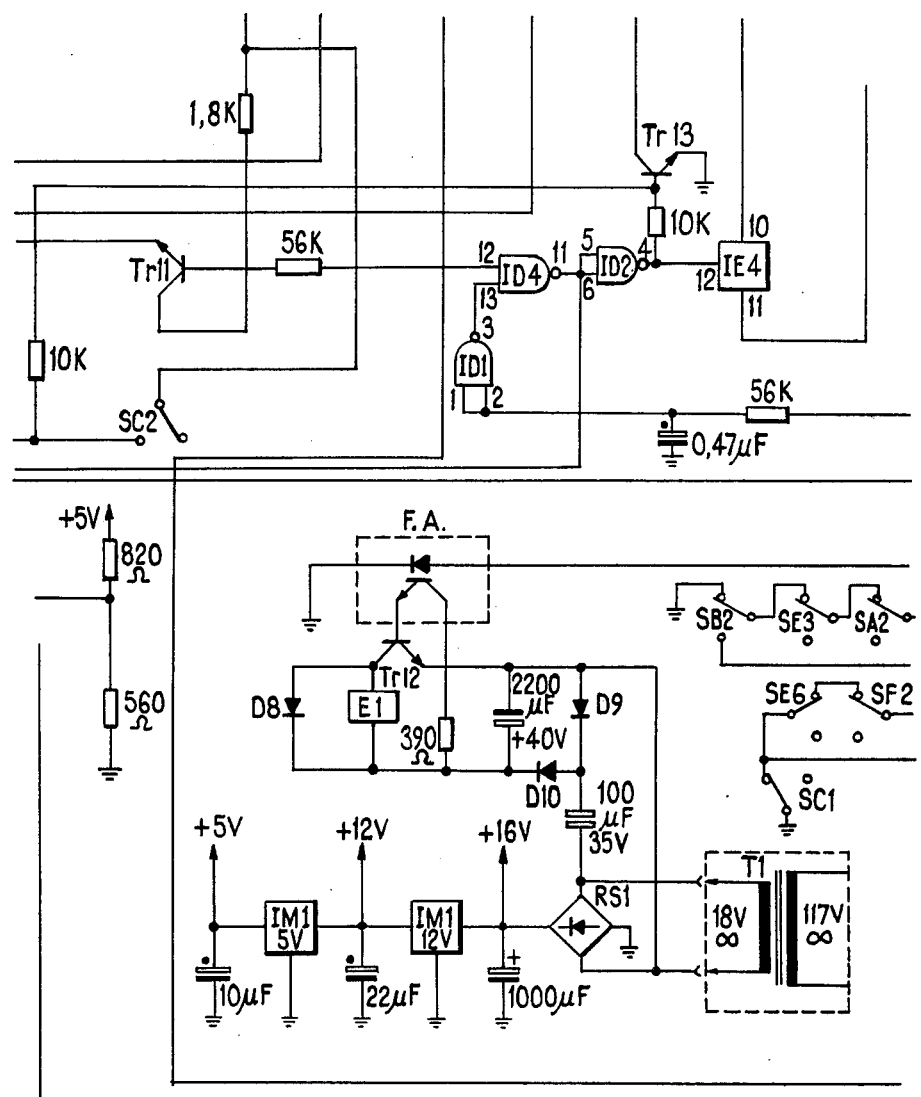

Further characteristics and advantages of the telephonic answering device controlled by a microprocessor and provided with an alphanumerical display according to the teachings of the present invention will become more apparent from the following detailed description of a preferred embodiment thereof, illustrated by way of an indicative and not limitative example in the accompanying drawings, where:

FIG. 1 illustrates by a partially perspective view the telephonic answering device according to the teachings of the present invention, as it externally appears;

FIGS. 2 to 6, arranged as illustrated in FIG. 1A represent a schematic circuit diagram of the telephonic answering device according to the present invention;

FIG. 7 illustrates the arrangement of the push-buttons associated to the telephonic answering device according to the invention; and FIG. 8 illustrates specific states of the display unit associated to the telephonic answering device according to the invention, as particular conditions occur.

Referring now to the aforesaid figures, and more specifically to FIG. 1, the telephonic answering device according to the invention will be firstly described with respect to the general aspects thereof and then it will be illustrated by reference to the electric circuitry thereof as represented in the figures.

The telephonic answering device according to the invention is an automatic telephonic answering device controlled by a microprocessor recording the calling party messages with a variable time.

The messages are recorded onto a conventional magnetic type recording device, using the so-called compact cassettes, and said messages may be heard by a built-in loudspeaker.

The telephonic answering device illustrated in FIG. 1 is able of transmitting two different announcement upon receiving telephonic calls. The first invites the calling party to leave or record a message, upon emitting a short duration acoustical signal, whereas the second does not invite the calling party to leave messages, being transmitted in the case in which the telephonic answering device is not in proper recording condition, for example due to the fact that the message cassette is at the tape end or it is failed. The telephonic answering device, in addition, may be operated only as a simple answering device, that is by recording one only announcement, with the desired contents, not inviting the calling party to record messages. In this case, at the end of the said announcement, the apparatus disengages the telephonic line. The telephonic answering device according to the invention has also the possibility of being remotely driven by the user by means of any set of the telephonic network, for re-transmitting to the user possible received messages and clearing the tape. This aspect, being characteristic of the present invention, will be described in a more detailed way hereinafter.

As it is shown in FIG. 1, the telephonic answering device according to the invention is furthermore provided with a complete telephonic set, built therein, which may be used as a conventional telephonic set.

As shown, the telephonic answering device according to the invention is inserted in a compact furniture piece, or box, for example of thermoplastics material, containing all the component elements. The parts relating to the built-in telephonic set, that is the handset, the dialing disc (or push-button assembly), telephonic circuitry, ringer, are located at the left side. On the front side is located the driving keyboard which, in the illustrated embodiment, consists of five push-buttons indicated by the reference numbers 1, 2, 3, 4, 5; the magnetic tape cartridge (of the endless type) for recording the announcement; the message cassette for recording the calling party messages (being of the so-called compact cassette type) with the control knobs for the related controls (not shown). As it is illustrated, on the upper portion of said box, is arranged a two digit opto-electronic display unit (of the seven segment type) which is able to provide alpha-numerical indications about the answering device operation. In the rear portion is located the electrical socket (not shown) thereto arrives the wire of a wall transformer (not shown), of small size, with the provided telephonic cable for the connection to the telephonic line. On the right side it is provided a sliding knob (not shown) for controlling the volume of the built-in loudspeaker. In the lower part of the box have been provided, even if they are not illustrated in the drawings, the following components:

the knob for adjusting the sound intensity of the ringer of the built-in telephone;

a two position switching element for selecting the delay time for the automatical response to the telephonic calls;

a row of five switches which are used for programming the coding or code for the remote driving, as it will become more apparent from the following description with respect to the circuitry.

In the inside of said box is present a single printed circuit board containing all the components (integrated circuits, transistors, diodes, capacitors, resistors and so on) forming the audio-frequency part of the apparatus and the microprocessor interfacing circuit, said microprocessor forming the controlling system according to the present invention.

Referring continuously to FIG. 1, it will be provided a first description about the operation of the telephonic answering device, and specifically with respect to the push-buttons thereof; it should be noted that the operation will be described thereinafter in a more detailed way referring specifically to the circuitry.

More precisely, by pushing or pressing the push-button 1 the telephonic answering device passes to a condition in which it is able of operating as a conventional telephone.

By raising the telephone handset, is engaged the telephonic line and if the exchange tone is of "telephone free" it is possible to use the dialing disc (or the keyboard) to carry out a telephonic call. At the end of the telephonic call, by replacing the handset in the housing thereof, the telephonic line is disengaged. It should be noted that with the push-button 1 pressed, the telephonic answering device does not automatically respond to the calls, being necessary to raise the handset and manually respond.

By pressing the push-button 3, or announcement recording push-button, the telephonic answering device passes to a condition in which it is able of recording the announcement to be transmitted in the automatically call response mode of operation. In this case the alpha-numeric display unit will display a predetermined letter pair, for example AR (Announcement Ready).

By pressing the push-button 2, or starting push-button, the announcement cartridge magnetic tape is driven and, by maintaining pressed said push-button 2, for holding the connection with the handset microphone used for the recording, it is possible to record the desired announcement. At the end of the first part of the announcement, in which the calling party is invited to record a message, it is necessary, for a while, to press the push-button 2 or starting push-button and re-press again immediately said push-button 2; in this way is recorded the tone (Beep-tone) advertising the calling party that he might start speaking. As the display unit lights again (for example after 0.7 seconds) the second part of the announcement has to be recorded, this second part being that which is transmitted in the case of an impossibility of recording the messages of the calling parties.

During the announcement recording, the display unit displays the lapsed seconds. It should be noted that it is possible to use different-duration announcement cartridges. If it is desired to operate the telephonic answering device as a simple telephone, it is sufficient to record one only announcement, that is without any invitation to leave or record messages.

By pressing the push-button 4, or automatic telephone response push-button, the telephonic answering device carries out the recorded announcement playback as it was thereinabove illustrated. During this step the display unit will display A[ (Announcement Check). At the end of this checking, which permits to establish if the announcement that the telephonic answering device transmits to the calling party is the desired one, and if the messege mechanics is properly predisposed or preset, the display unit will display □K (OK) which means that the telephonic answering device is ready for responding to the arriving telephonic calls.

As a telephonic call arrives, the telephonic answering device, depending on the fact wether it is programmed for responding either after the first or the fourth calling signal, engages the telephonic line correspondingly and the display unit will start to intermittently light or pulse. The announcement magnetic tape will start to move and on the telephonic line will be transmitted the first part of the announcement. After the transmission of a suitable tone (beep), the calling party may pronounce or leave a message which is recorded in the provided message cassette. The recording continues untill a suitable voice responsive circuit recognizes that the calling party is speaking. A pause greater than seven seconds, or a recording having a duration greater than three minutes, causes the recording to interrupt, and the display unit counts the call, the telephonic answering device transmits through the telephonic line the second part of the announcement and then, at the end of this latter, it sends the remote-call code and, finally, clears the telephonic line or disengages therefrom.

According to the invention, if the calling party does not record any message, upon the elapsing of a predetermined time period, for example seven seconds, from the acoustical signal (beep-tone), the telephonic answering device sends the second part of the announcement and then the remote-call code and, finally, disengages from the line and automatically re-winds the message cassette tape for a length corresponding to the elapsed seven seconds, thereby preserving said tape. In this way are not formed noxious recording species which, in addition to waste tape, are greatly fastidious for the user during the message playback step. In this case the display unit is not incremented and the telephonic answering device is ready to respond to the next telephonic call.

As a new telephonic call arrives, the display unit starts to intermittently light and the telephonic answering device responds as thereinabove described, but, instead of transmitting the first part of the announcement, it transmits the second one since, as the message mechanics is not able of automatically recording the messages, the announcement cartridge is preset for transmitting the second part of the announcement which does not invite the calling party to record a message. In this case the display unit will display [F (Cassette Fault). At the end of the announcement tape, the telephonic answering device will send the remote-call code and will disengage the telephonic line, being immediately ready for responding to the next telephonic call.

If the announcement is of the type which does not invite the calling party to record a message (Announcement without Beep-Tone), at the arrival of a call, the telephonic answering device will respond by emitting or sending the announcement and, at the end thereof, it will disengage the telephonic line. For all the time in which the telephonic line is engaged, the light display will intermittently light.

As stated, according to the invention, the instant telephonic answering device may be remotely driven by a voice code which may be simply used, while being of a reliable operation.

As stated, in the lower portion of the box, has been provided a multiple rectangular shape switch containing, in this embodiment, five small switches; these latter serve to predispose the personal code which may be selected between 31 combinations. The thirty-second combination (that is with all the switches in the off position) means an exclusion of the remote call. To each switch in the ON position should correspond a response word by the calling party, whereas to all the switches in the OFF position should correspond a silence. In the normal use, the tones for the remote call immediately follow the end of the second part of the announcement and are sent in the order 1, 2, 3, 4, 5 and 6.

It should be noted that the time period between a tone and the next one is not fixed being shortened as the code receiver detects the calling party response. This is very useful in the direct dialing since it reduces the costs. At the end of the tone series, if the received code corresponds to the preset code, the apparatus begins to re-wind the tape, this being associated to the transmission of timed tones for all the re-winding time. At the end the apparatus starts the received message playback and stops only as it has reached the end of the last message. At this point it transmits a prolonged tone which indicates that the playback is at the end and the calling party may select between two solutions, that is: if to leave the things as they are, and in this case the apparatus will add the next messages to those already received, or to cancel the messages just heard, thereby the next message will replace the old one (it should be noted that each of said two solutions presents advantages and drawbacks; in the first case it is possible to have a cassette with many messages, but there is a risk that the apparatus autoexcludes upon reaching the maximum limit of thirtytwo calls or upon reaching the end of the message cassette. In the second case this risk does not exist but, if among the received message is present a message which has to be preserved, then a clearing or cancelling operation would cause a loss of all the messages. In this cases only the interested person may decide which of the two solutions is the better).

It should furthermore be pointed out that the telephonic answering device transmits the tones for the remote calling only in those cases in which it is possible and useful, whereas it does not emit said tones for example in the case in which the message mechanics has not been properly preset or in the case in which messages have not been received.

It will be thereinbelow described the message playback operation.

By pressing the push-button 5, or message playback push-button, it is carried out an automatic re-winding of the message tape and one may recognize that the message number decreases quickly down to 1, which indicates the first received message, immediately begins the playback of the received messages. At each recording is possible to read the related number and the playback operation continues as far as the apparatus has reproduced all the messages. The telephonic answering device automatically stops. It is obvious that it would be also possible, during the playback operation, to use the mechanics control knobs to cause the tape to quickly advance or move back. The system which permits to assign to each message the progressive number thereof holds until the message cassette is left in the seat thereof, and, in the case in which it is removed, any reference to the existing recordings will be obviously cancelled and, by re-inserting a message cassette will appear the display [P (Cassette Playback) and the message mechanics will normally playback or reproduce the information or messages recorded onto the tape.

As it will be specifically illustrated thereinbelow, the telephonic answering device according to the invention has been furthermore provided with several safety devices monitoring the good operation of each critical part thereof. In any time, and for any malfunctions the safety system is able of taking those decisions which are suitable for limiting to a minimum the possible damages. In particular, has been protected the telephonic line which is opened by the safety systems or devices immediately upon the occurring of a malfunction.

In particular, the main controlling or monitoring assemblies are two, one controlling the announcement mechanics and the cartridge thereof and the other controlling the message mechanics. With respect to the announcement mechanics, a safety timer continuously controls that the time necessary for carrying out a working cycle be always equal with a maximum drift or shift of five seconds. In the case in which something would not properly operate, after said time the motor is caused to stop, the telephonic line is opened and the display unit will display AF (Announcement Fault) and the telephonic answering device will not respond to any calls. With respect to the message mechanics, the safety systems or devices control both the good operation of the message cassette or mechanics, and the proper position of the control knobs. In the case of a malfunction, the driving motor immediately stops and the display unit will display [F (Cassette Fault); in the case of an error the display unit will on the contrary display [E (Cassette Error) and in both cases the telephonic answering device will respond to the calls by the second part of the announcement.

Referring now to the circuitry of the telephonic answering device according to the invention, as illustrated in FIGS. 2 to 6 and to be arranged as it is shown in FIG. 1A, the operation of said telephonic answering device will be thereinbelow more specifically described on the basis of the already supplied description and by using, in particular, the reference characters of the aforesaid FIGS. 2 to 6.

More specifically, the operation will be described with reference to the following steps thereof:

announcement recording;
initialization;
announcement test;
call waiting;
telephonic call; simple announcement transmission;
transmission of the announcement with a beep-tone present
transmission of the second part of the announcement;
transmission of the tones for the remote calling;
message remote playback;
safety systems or devices;
conventional message playback.

In addition, with reference to FIG. 8 will be illustrated particular states of the alphanumerical display unit associated to the telephonic answering device according to the invention, in the following cases:

replacing of the announcement cartridge;
announcement cartridge failed;
announcement cartridge not present;
announcement test;
erroneous preset of the message mechanics and message cassette not present; and
message cassette failed.

Figure 6:
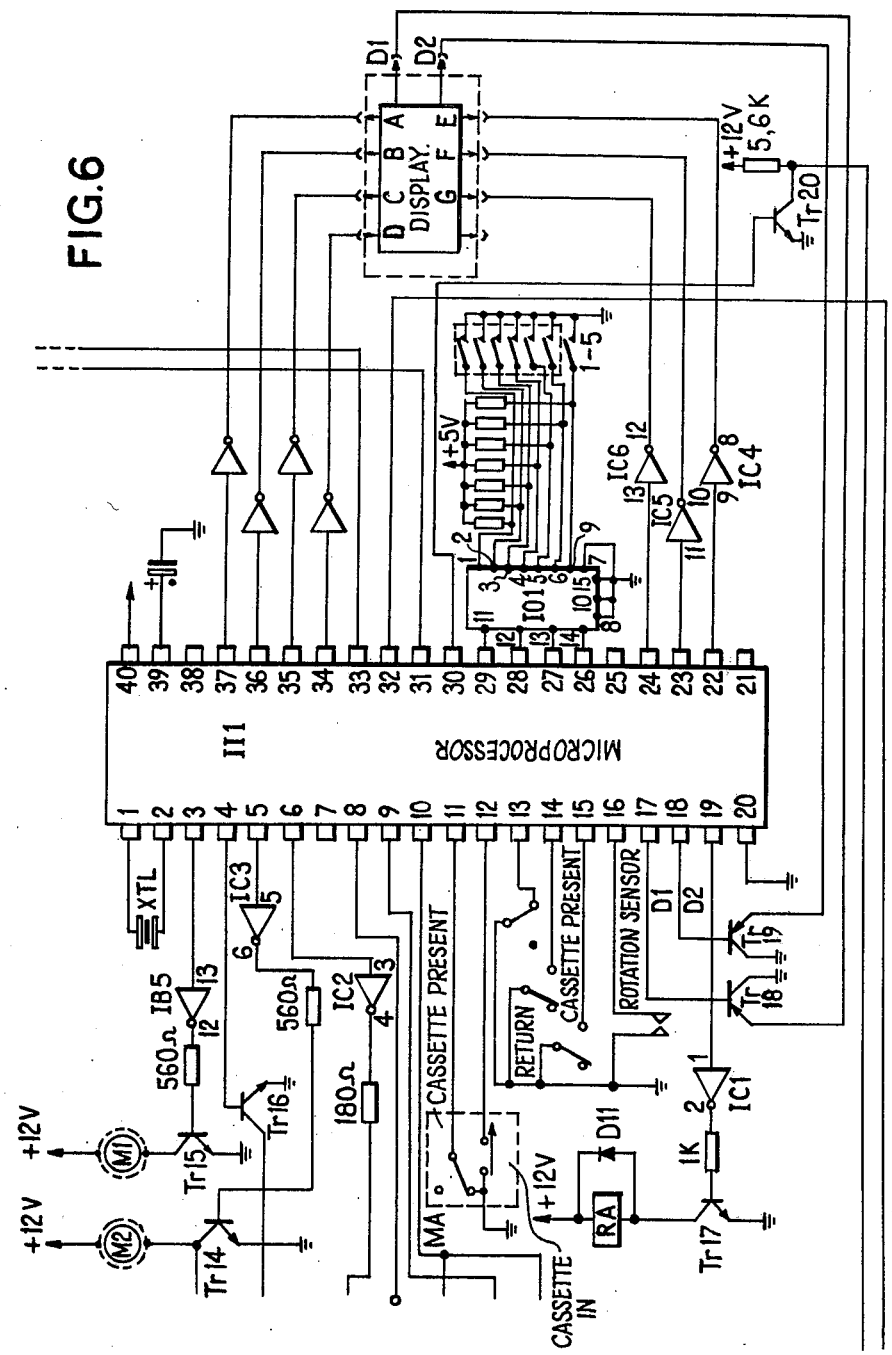

It should be noted that the core of the telephonic answering device according to the invention consists of the microprocessor, which controls all the function or operating mode of said telephonic answering device. Said microprocessor, as it is shown in FIG. 6, is provided with a plurality of inputs (from 1 to 20) and with a plurality of outputs (from 21 to 40). It is this microprocessor which directly controls by means of outputs thereof connected in the shown way, the display unit visually displaying the operating mode and/or possible malfunctions of the telephonic answering device itself.

As stated, the use of a microprocessor constitutes a main feature of the invention.

Are thereinbelow considered in a rather detailed way, the main operating modes of the telephonic answering device.

I.D. Announcement Recording Mode

By pressing the recording push-button SC, the section SCI removes ground from the inputs 9 and 10 of the microprocessor ($\mu P$) whereas the input 8 is at ground through the sections SA2, SE3, SB2. This pattern at the input of the microprocessor is seen as a drive for starting the program inherent to the announcement recording. If the announcement cartridge is not in the proper position (metalized contact opened) at the input 12 of the microprocessor is not present ground and hence it is necessary a new replacing of the announcement cartridge. At this time, the output 3 of the microprocessor is grounded and, through IB5 and TR15, is started the motor M1 of the announcement mechanics, and simultaneously the display unit being driven as described at A1. As the proper position of the announcement cartridge has been reached, the input 12 of the microprocessor is grounded by the metalized contanct (see the figures) and the microprocessor causes the outut 3 to go high, thereby stopping the announcement mechanics motor M1. Contemporaneously, the telephonic answering device indicates the new state by displaying AR on the display unit, and this is implemented in the following way: at the begin it causes the outputs 17-22-23-35-36-37 to go low for a time period of 2 milliseconds, displaying the letter A on the display D1. Then it causes the aforesaid outputs to go high, and causes the outputs 18-23-24-34-35-36-37 to go low for a period of time of 2 milliseconds, thereby switching off the display unit D1 and displaying the letter R on the display D2. Due to the high operation speed, the user will see AR (Announcement Ready). This operation mode continues as far as the announcement cartridge is left in the housing thereof or as far as another drive is imparted. If during the replacing operation of the announcement cartridge the tape would break or block, after a determined time as stored in the microprocessor, the output 3 goes to a high level thereby immediately stopping the motor M1. Contemporaneously, the display unit will display AF (Announcement Fault) as described at A2.

If the push-button SC is pressed when the announcement cartridge is outside the housing thereof, or if with the push-button SC already pressed the announcement cartridge is removed, then the output 3 of the microprocessor is caused to go high thereby stopping the motor M1 (if it was in operation) and displaying AE (Announcement Error) as described in A3.

As the display unit displays AR, the telephonic answering device is ready for the recording; in this case, if the push-button SB is pressed (see the figures), the contact SB2 opens and removes ground from the pin 8 of the microprocessor which goes high. The pattern now present at the inputs 8-9-10 is such that it may be recognized as a starting drive for the announcement mechanics.

The microprocessor causes the output 3 to go low, which starts the motor M1 and moreover causes the outputs 18-22-23-34-35-36-37, corresponding respectively to the enabling of the display unit D2 and to the segments A-B-C-D-E-F to go low, thereby a zero will be displayed. After a period of time equal to a second, the outputs 22-23-34-37 are caused to go high and; a 1 will be displayed since remain lightening only the segments B and C. After a period of time equal to a second, the number 2 will be displayed, and the number 3 and so on until the motor M1 holds in movement.

If during the operation, the pushbutton SA is released and then again pressed, the input 8 of the microprocessor through SA2 will see, firstly, a high level and then a low level again. This level change is interpreted by the microprocessor as a drive for the recording of the beep-tone, and then it causes the output 4 to go low which, with TR16, enables the tone oscillator (TR3). Simultaneously, it causes the output 18 to go high and switch off the display unit D2. After a period of time equal to 0.5 seconds, the output 18 goes low and all returns as before. The counting of the seconds continues on the display unit until the metalized tape zone presents on the provided contacts and, in this case, the input 12 of the microprocessor goes low, and accordingly the output 3 thereof goes high thereby stopping M1 and on the display unit is displayed AE as in the operation mode thereinbelow described.

2.0 Telephonic Position

2.0.1 Initialization

By pressing the push-button SE, the sections SE3 and SE6 open and remove ground from the inputs 8 and 9 of the microprocessor (see the figures) whereas the input 10 is held at the ground potential by the section SC1. This pattern at the inputs 8-9-10 is interpreted by the microprocessor as a drive for starting the programm inherent to the telephonic response and recording.

If the announcement cartridge is not in its housing, on the display unit will be displayed the letters AE, according to the mode thereinafter described at A3.

If the announcement cartridge was failed, on the display unit will be displayed the characters AF as described at A2. If the announcement cartridge is in its housing, but the metalized contact is not present, then the input of the microprocessor will be at high level, and it is necessary to locate again the cartridge. In this case, the output 3 of the microprocessor is brought to ground, the motor M1 starts whereas on the display unit is displayed a rotating segment as it will thereinafter be described at A1.

As the metalized contact or portion short-circuits the contacts, the input 12 of the microprocessor is brought to ground and the re-placing of the cartridge will end. At his pont beings the announcement test step.

2.0.2 Announcement Test

The output 3 of the microprocessor is brought to ground, the motor M1 starts and causes the starting of the tape reading whereas the display unit will display A[ (Announcement Check) as thereinafter described at A4.

If during the reading of the tape the detecting circuit (IGI-TR2) detects the presence of the BEEP-TONE, the input 32 goes low and a store in the inside of the microprocessor stores this event. Immediately after, the microprocessor controls the position of the message mechanics control knobs and a suitable store which is actuated only in the cases in which is exceeded the maximum call number (32), or in the case of a locking of the message tape.

In the cases in which one of these two criteria is valid, the output 3 goes high and M1 stops whereas the display unit will display CE (Cassette Error) in the first case, as thereinafter described at A5, or CF (Cassette Fault) in the second case as it will be thereinafter described at A6. In the case in which none of these two criteria is valid, the motor M1 will continue to operate until the metalized zone of the tape arrives on the contacts thereby grounding the input 12 of the microprocessor. At this point it is entered the call waiting for step.

2.0.3 Call Waiting for Step or Mode

The output 3 of the microprocessor is brought high, the motor M1 stops (if it was in operation) and immediately begins a series of periodical tests continuing until the apparatus is in the call waiting for mode.

At first the microprocessor controls that the announcement cartridge is in the housing thereof, and, in the case in which it is removed, the display unit will display AE as thereinafter described at A3.

The second control or checking is on the beep-tone or memory (see the point 2.0.2). In the case in which the state of the memory or store corresponds to that assumed in the presence of an announcement without the beep-tone, the display unit will display A☐ (Answering Only). In fact, the microprocessor causes the outputs 17-22-23-24-35-36-37 to go low for a two milliseconds time, and the display unit will display the letter A on the display element D1. After this time the microprocessor causes the outputs 17 and 24 to go high and the outputs 18 and 34 to go low for other two milliseconds, displaying the letter ☐ on the display D2. After two milliseconds, the display D2 is disabled and the display D1 is enabled again as thereinabove described and, owing to the high operating speed, the user will see A☐ (Answering Only).

The third control is on the proper position of the message mechanics control knobs and on the presence of the message cassette. If one of the two criteria is not considered valid, the display unit will display [E (Cassette Error) as thereinafter described at A5.

The fourth control is made on a suitable register of the microprocessor which stores the impossibility state of the message mechanics to continue to operate or the reaching of the maximum call number (32). If this register has been actuated, the display unit will display [F (Cassette Fault) as thereinafter described at A6.

The fifth control is made on the presence of the metalized tape zone of the announcement cartridge which, under normal conditions, has to be always present.

If, for any reasons, the contact should fail, the input 12 of the microprocessor goes high and accordingly the output 3 goes low thereby starting the motor M1 and simultaneously the display D1 will display a rotating segment as thereinafter described at A1.

The last three described controls will be made only in the case in which the announcement is of the type with the beep-tone and if all is in order, the microprocessor will cause the output 18-22-23-24-35-36-37) to go low, thereby causing the display D2 to display the letter K (O.K.).

By resuming, the telephonic answering device may be in the call waiting for mode with four different indications on the display unit thereto will correspond three different operating modes during the calling.

2.0.4 Telephonic Call

In the lower portion of the box is located a switch which permits a selection between an immediate intervention or a delayed intervention of the telephonic answering device. Normally it is possible to select between one or four telephone rings. The call detecting circuit (TR 21) is connected to the input 33 of the microprocessor. If the switch is in the 1 position, at the first call, the input 33 goes low and immediately after M1 is started by means of the output 3 and is also started the announcement transmitting step. If the switch is in position, a counter in the inside of the microprocessor will increment by one unit each time the input 33 goes low and at the fourth ring it will start the motor M1 as thereinabove illustrated.

2.0.5 Transmission of the Simple Announcement

Immediately after the call ring (or the call rings), the microprocessor causes the outputs 3 and 19 to go low thereby starting the motor M1 and actuating the relay RA which closes the telephonic line. As far as said relay remains energized, the outputs 17 and 18 corresponding to the enablings D1 and D2 of the display unit, will pass from an high level to a low level, thereby causing the display to pulsate. As the tape has completed a turn, the metalized zone will cause the input 12 to go low and accordingly the outputs 3 and 19 will go high thereby stopping the motor M1 and opening the telephonic line. Also the pulsating of the outputs 17 and 18 will cease and the display unit will again display A☐ in the conventional or usual way. At this point the telephonic answering device returns to the calling waiting for mode as thereinabove described at the point 2.0.3.

2.0.6 Transmission of the Announcement with Beep-Tone Present

Immediately after the call ring (or call rings) the microprocessor causes the output 3 to go low and starts the motor M1. Simultaneously a counter, located in the inside of the microprocessor, will increment by one unit and will display on the microprocessor the contents thereof which may be any number between 1 and 32. Furthermore the microprocessor will cause the output 19 to go low thereby operating the rele RA and closing the telephonic line. As far as said rele remains energized, the outputs 17 and 18, corresponding to the enabling D1 and D2 of the display unit, will pass from a high level to a low level thereby causing the indication on the display unit to pulse. The presence of the beep-tone will be detected by the suitable detector (IGI-TR2) which will cause the input 31 to go low. As the beep-tone ceases, the input 31 goes high and accordingly also the output 3 goes high thereby stopping the motor M1. Then the output 5 will go low and will start the motor M2 which is the motor of the message mechanics. The recording of the message may be short or long but, in any case it is not greater than three minutes since a counter in the inside of the microprocessor, after this time, will interrupt the recording, in such a way as to pass to the step in which is transmitted the second part of the announcement (see 2.0.7). If, on the contrary, the recording is relatively short (lesser than three seconds), then the call is not considered valid and, at this point, the microprocessor causes the output 6 to go low thereby energizing the electromagnet E1 and causes the tape to go back as far as to reach the precise point in which it was before the last call. This is possible since each time the message mechanics moves, a suitable sensor connected to the input 16 of the microprocessor transmits pulses which are counted by a counter in the inside of the microprocessor. As the tape has reached the precise starting point, the outputs 5 and 6 go high thereby stopping the motor M2 and disenergizing E1 and the telephonic answering device passes to the step in which is transmitted the second part of the announcement (see 2.0.7). If the duration of the message is greater than three seconds, the call is considered valid and, at the end of the recording, the counter involved in the counting of the calls will increment by an unit and simultaneously the contents of the tape counter will be stored in one of the 32 stores or memories predisposed for this function, being started the second announcement part transmitting step.

2.0.7 Transmission of the Second Part of the Announcement

The output 3 is caused to go low and the motor M1 is started, as the metalized zone short-circuits the contacts the input 12 goes low and the motor M1 is stopped. At this time, if the remote call has been preliminarily excluded (all the five switches on SILENCE), then the relay RA is disenergized and the telephonic answering device passes again to the waiting for mode as described at 2.0.3. If, on the contrary, the remote call has not been excluded, the telephonic answering device will start the transmission of the tones.

2.0.8 Transmission of the Tones for the Remote Call

The output 4 of the microprocessor goes low and enables the tone oscillator (TR3) for a time period equal to 0.3 seconds; then that same output goes again high and the telephonic answering device waits for a possible response to the emitted tone. If a response arrives, then the input 32 goes low and the telephonic answering device will immediately emit the next tone; if, on the contrary, does not arrive a response, after 1.8 seconds it will equally transmit the next tone which will have the same characteristics of the preceding one, and the procedure is repeated as far as the number of the emitted tones has reached five. As the transmission or emission of the tones has been completed, the microprocessor carries out a comparing between the predisposed code and the received code and, if the two codes are not equal, the output 19 will go high, the relay RA will be disenergized and the telephonic answering device will pass to the call waiting for mode as thereinabove described 2.0.3.

If, on the contrary, the two codes are equal, the outputs 5 and 6 will go low, the motor M2 will start and the electromagnet E1 will be energized, the mechanics re-winds the tape and the rotation sensor will open or close the input 16 of the microprocessor.

As the number of the pulses sent by the sensor coincides with the number stored during the recording, the tape will be arrived at the beginning of the call series, the output 6 will go high thereby disenergizing E1 and will be started the received message playback operation. Furthermore, during the tape re-winding step, the output 4 will alternatively pass from the high state to the low state thereby either enabling or not the note oscillator (TR3) which will emit timed tones in order to signal the aforesaid operation.

2.0.9 Remote Drive Message Playback

Upon carrying out the re-winding of the tape as thereinabove described at 2.0.8 the telephonic answering device will begin the message playback by sending on the telephonic line the contents of the recordings. The mechanics rotation sensor transmits pulses to the input 16 of the microprocessor which pulses are counted by the provided counters, inside the microprocessor, and compared against a memory which remembers the precise point corresponding to the end of the last recording.

As the counted pulses are equal to the stored pulses, the output 5 will go high and the motor M2 is stopped. Furthermore, the output 4 will go low and the oscillator (TR3) will emit a tone having a length equal to 1.2 seconds to signal the calling party that the playback is ended. Immediately after the tone, the telephonic answering device will wait for a possible response by the calling party. If the calling party does not provide any response after four seconds, then the output 19 of the microprocessor goes high, RA disenergizes, and it is entered the call waiting for step or mode as thereinabove described at 2.0.3. If, on the contrary, the calling party response, the input 32 will go low whereas the output 4 will drive the note or tone oscillator TR3 for a time equal to 1.8 seconds. After this time, the outputs 4 and 19 go high, the tone ends and the relay RA disenergizes, immediately after the outputs 5 and 6 go low, thereby starting the motor M2 and energizing E1 and starting the re-winding operation of the tape.

As the number of the pulses sent by the message mechanics rotation sensor coincides with the number stored by the microprocessor at the begin of the recording series, the outputs 5 and 6 will go high, M2 will stop and E1 will disenergize, being entered the call waiting for step or mode, as thereinabove described at 2.0.3.

2.0.10 Safety System

In any operating mode are provided safety systems effective to operate if required.

More specifically, if the announcement cartridge is removed from the housing thereof, the presence sensor will cause the input 11 of the microprocessor to go low and immediately all the motors are stopped and the telephonic line is cleared, whereas the display unit will display AE (Announcement Error) as thereinafter described at A3. If the announcement cartridge fails, the safety systems will operate as above, the sole difference being that the display unit will display AF (Announcement Fault) as thereinafter described at A2.

If the message cassette is removed from the housing thereof, the presence sensor will cause the input 15 to go low and immediately the telephonic answering device will pass to the announcement test mode, as described at 2.0.2, and then to the call waiting for mode as thereinabove described at 2.0.3 and the display unit will display [E (Cassette Error) as it will thereinafter described at A5.

If the message cassette fails, or if the tape ends, then the rotation sensor will not send any pulses to the input 16 of the microprocessor and, after four seconds, the motor is stopped and the telephonic answering device will pass, at first, to the announcement test mode as thereinabove described at 2.0.2 and then to the call waiting for mode as hereinabove described at 2.0.3, and the display unit will display [F (cassette Fault) as it will be thereinafter described at A6.

In the case in which the mains fails during the operation of the telephonic answering device, as the mains supply is recovered, the telephonic answering device will execute the steps 2.0.1–2.0.2 and 2.0.3, to stop in the call waiting for mode, with the indication [F (Cassette Fault) as it will be thereinafter described at A6.

3.0 Message Playback

By pressing the push-button SF2, the section SF2 opens and the input 9 of the microprocessor (see the figures) goes high, whereas the input 8 is held high by the sections SA2-SB2-SU3 and the input 10 is held low by the section SC1. This pattern on the inputs 8-9-10 is interpreted by the microprocessor as a drive for starting the program relating to the message cassette playback.

If the message cassette is not in the housing thereof, the display unit will display [E (Cassette Error), as it will be thereinafter described at A5.

If the message cassette is introduced into the housing thereof as the push-button SF has been already pressed, the output 5 of the microprocessor will go low therby starting the motor M2; in this case the display unit will display [P (Cassette Playback).

If, as the push-button SF is pressed, the cassette contains recordings not yet heard, the outputs 5 and 6 go low, the motor M2 starts and the electromagnet E1 energizes thereby starting the automatic re-winding. During this step, the mechanics rotation sensor will send pulses to the input 16 of the microprocessor which pulses will be counted and compared both against the memory storing the tape position corresponding to the starting of the first recording, and against those memories remembering or storing the precise position, on the tape, of the single calls. Each time that, during the movement, the tape counter assumes a configuration equal to that contained in a store register, the call counter will decrement by one unit the contents thereof. During this operation mode, or step, the display unit will display the contents of the call register and the shown number will decrease from the starting value to 1.

As the contents of the tape counter is equal to that stored as the starting point of the first recording, the output 6 will go high, the electromagnet E1 will disenergize and the message playback mode will start.

Also during the playback message mode, each time the contents of the tape counter becomes equal to the stored content, the call counter will increment or decrement by one unit, depending on the fact whether the tape is moving frontwardly or rearwardly, and the display unit will display the progressive number thereto corresponds the recording being heard.

As the contents of the tape counter reaches the value stored as the end of the last recording, the output 5 goes high and the motor M2 stops.

If, during the movement, the tape ends, then the rotation sensor will not send any further pulse to the input 16 and, after four seconds, the output 5 will go high and the motor M2 will stop.

A1 Replacing of the Announcement Cartridge

As it is necessary to replace the announcement cartridge, the microprocessor starts by grounding the output 17, which is the enabling of the display D1, and the outputs 36 and 37 which, through IB1 and IB2 enable the segments A and B of the display unit (see FIG. 8).

In this way, the aforesaid segments will light remaining in this state for a time period equal to 120 milliseconds. After this time period the microprocessor will cause the output 37 to go high thereby turning off the segment A and will cause the output 35 to go low which, through IB3, causes the segment C to light. After 120 milliseconds, it causes the output 36 to go high thereby turning off the segment B and causing the output 34 to go low which output, through IB4, turns on or causes the segment D to light. After 120 milliseconds it causes the output 35 to go high thereby turning off the segment C and causing the output 22 to go low which, through IC4 causes the segment E to light. After 120 milliseconds it causes the output 34 to go high thereby turning off the segment D and causing the output 23 to go low which, through IC5, turns on the segment F. After 120 milliseconds, it causes the output 22 to go high thereby turning off the segment E and causing the output 37 to go low which, through IB1 turns on again the segment A. The practical effect which is displayed is that of a rotating segment which indicates that the announcement cartridge is recovering.

A.2 Announcement Cartridge Failed

If the push-buttons SC or SE are pressed and the announcement cartridge is failed (broken or locked), then the microprocessor causes the outputs 17-22-23-35-36-37 to go low for a 2 millisecond time and the display unit will display on the display element D1 the letter A.

After this time it causes the thereinabove indicated outputs to go high and drives to a low level the outputs 18-22-23-24-37 for other 2 milliseconds. This operating mode continues as far as the announcement cartridge is left in the housing thereof or as far as the push-buttons SC or SE are pressed. Due to the high operating speed, the user will see on the display unit the letters AF (Anouncement Fault).

A.3 Announcement Cartridge Not Present

If the push-buttons SC or SE are pressed and the announcement cartridge is not in the housing or seat thereof, then the microprocessor causes the outputs 17-22-23-24-35-36-37 to go low for a 2 millisecond time, and the display unit will display on the display element D1 the letter A.

After this time it causes the outputs 17-35-36 to go high and drives to low level the outputs 18-34 for other 2 milliseconds; the display unit displays on the display element D2 the letter E.

This operating mode continues as far as the announcement cartridge is removed from the housing thereof or as far as the push-buttons SC or SE are pressed.

Due to the high operating speed, the user will see on the display unit the letters AE (Announcement Error).

A4 Announcement Test

During the overall step of the announcement test on the display unit are present the letters A[ (Announcement Check). At first the outputs 17-22-23-24-35-36-37 are grounded and the display element D1 lights in such a way as to display the letter A. After a time period equal to 2 milliseconds, the outputs 17-24-35-36 are brought to a high level and the outputs 18-34 to a low level, thereby enabling the display element D2 which will display the letter [. After two milliseconds the display element D2 is disabled and the display element D1 enabled again, as thereinabove described, and, due to the high operating speed, the user will se A[ (Announcement Check).

A5 Erroneous Preset of the Message Mechanics or Message Cassette not Present If with the push buttons SE or SF pressed the message cassette is not in the housing thereof or with the push-button SE pressed the positions of the message mechanics control knobs are not properly set, then the display unit will display [E (Cassette Error).

The microprocessor causes the outputs 17-22-23-34-37 to go low for a time of 2 milliseconds displaying the letter [ on the display element D1.

After this time it causes the output 17 to go high and the outputs 18 and 24 to go low for other 2 milliseconds and the display unit will display the letter E on the display element DE. After 2 milliseconds, the display element D2 is disabled and is enabled the display element D1 as thereinabove described, and, due to the high operating speed, the user will see [E (Cassette Error).

A6 Message Cassette Failed

If with the push-button SE pressed the message cassette ends or fails, or if the received call number is of 32, then the display unit will display [F (Cassette Fault).

The microprocessor causes the outputs 17-22-23-34-37 to go low for a 2 millisecond time, displaying the letter [ on the display element D1. After this time, it causes the outputs 17 and 34 to go high and the outputs 18 and 24 to go low for other 2 milliseconds, displaying the letter F on the display element D2. After 2 milliseconds, it disables the display element D2 and enables again the display element D1 as thereinabove described and, due to the high operating speed, the user will see [F (Cassette Fault).

From the above description it should be noted that the present invention provides a telephonic answering device, controlled by a microprocessor, which fully achieves the intended objects.

In particular, owing to the presence of the alphanumeric display unit having two seven segment display elements, it allows for a direct "conversation" with the user to be made relating to the operating states and/or possible malfunctions of said telephonic answering device.

In the announcement recording step or mode, the telephonic answering device according to the invention counts and displays the seconds that the user at at disposal for recording the announcement; in this step, as thereinabove illustrated, is provided a particular indication indicating the recovering of the announcement cartridge or the reset to 0 thereof. In particular, if the announcement cartridge is not inserted, at the proper time it is reset, that is brought to 0. A segment of the display unit rotates to indicate that the announcement cartridge is resetting thereby preventing the user from erroneously recording announcements. At the begin the display unit indicates the announcement recording. In order to control or check the anouncement, as thereinabove described, has been provided another letter pair. Also in the case of a fail of the announcement cartridge, after the mentioned time of 5 seconds beyond the duration of the announcement cartridge is provided a signalling. Also if one passes to the playback step without inserting the cartridge is provided an indication.

In the telephonic position, the telephonic answering device according to the invention has the possibility of operating as a simple telephone, that is without recording messages; in this step or mode is provided an announcement cartridge test and the display unit counts the arriving calls. As stated, and this is a main feature of the telephonic answering device according to the invention, it counts and records only the true calls and recovers the tape if arrives a non effective call. This is very useful both in that it allows for tape to be saved and in that, during the playback step, are eliminated for the user the drawbacks relating to interruptions between the received calls.

The telephonic answering device according to the invention also provides a very fine or precise numerical control of the tape. This control is obtained by a counter system which permits to know, at any time and for any tape speed (fast winding, fast re-winding or normal re-winding) the tape position, with very close tolerances. Also in the message recording step or mode are provided error and malfunction indications, in particular, if the message cassette is absent or if it is failed, the display unit provides a signalling. Also in the case of a cassette end is provided an indication as well as is provided an indication if the control knobs are erroneously set.

As thereinabove described, the telephonic answering device according to the invention has also the possibility of equally partially operate on the telephonic line in the case of an error or of a cassette malfunction. More specifically, the telephonic answering device transmits an announcement without inviting the calling party to leave a recording. The telephonic answering device according to the invention has also the possibility of being remotely driven, being this a very useful feature: the remote driving is carried out by a code in turn driven by the calling party or user voice; at the end of each communication, the telephonic answering device transmits five tones on the line, said tones being suitably spaced. After each tone the calling party may speak, or he may remain in silence: in this case it is possible to obtain 31 codes for example by using five switches, a further possible thirty second code being that with all the switches set at 0, thereby excluding the remote driving. This represents a further safety. With respect to this aspect of the present invention it should be noted that whereas in the existing codes there are obliged points (for example obligatorily on a certain number the user has to respond yes or no, obligatorily the user has to decide, before hearing the messages whether to clear or not the counter), on the contrary in the telephonic answering device according to the invention it is possible to carry out a selection by a further sixth tone which is transmitted only at the end of the recorded messages. In other words while in the other voice codes the times are fixed, in the telephonic answering device according to the invention the maximum length depends on the type of the selected code and on the response modalities: the telephonic answering device, upon recognizing the code, immediately provides the next tone and, in addition, the remote driving signals are transmitted only if the telephonic answering device has messages to be transmitted.

This allows for savings to be made which, mainly in the direct dialing, provide a remarkable reducing of the general costs.

As stated the telephonic answering device according to the invention, in the case of a mains fail, does not exclude and, as the mains is recovered it is able of operating again while preserving the previously received messages.

Furthermore the user has the possibility of remotely resetting the full capacity of the telephonic answering device with respect to the receiving of the messages. During the playback mode on the display unit is displayed the number of the received messages: the telephonic answering device according to the invention automatically re-winds the tape at the begin of the first, being displayed a number indicative of this operation. These references remain as far as it is desired by the user even if he momentaneously releases the message playback position. As stated the telephonic answering device according to the invention is able of beginning the recording from any point of the message cassette, this property being useful if, for example, the user desires to preserve any calls while using a part of the message cassette. Finally, in the telephonic answering device according to the invention has been provided the possibility of protecting the messages from possible intrusions or curiosities, this possibility being for example obtained by a suitable switch the position thereof being known only to the user.

While the telephonic answering device has been thereinabove described with reference to a specific embodiment thereof, it should be noted that it is susceptible to several modifications and variations all falling within the inventive concept scope. Thus, for example, while in the preceding description reference has been made to a code effective to be set by five switches, it falls within the scope of the invention to determine the code personalizing the telephonic answering device by any number of switches and/or other equivalent means.

We claim:

1. A telephonic answering device effective to operate according to a plurality of modes, including announcement recording and playback modes, telephonic message recording and playback modes, a remotely controlled message playback mode, and a tone sending mode that sends a plurality of time spaced tones to initiate said remotely controlled playback mode in accordance with a preselected voice code, comprising in combination, announcement and message recording means for recording announcements and telephonic messages and playing back said announcements and telephonic messages respectively, first and second means for driving said announcement and message recording means in either forward or reverse directions respectively, a variable-time voice coding means to control the initiation of said telephonic answering device in said remotely controlled playback mode, said voice coding means being responsive to voice sounds of the calling party enunciated during time intervals between said spaced tones to initiate said telephonic message playback mode, said voice coding means responding to said voice sounds to vary said time intervals between adjacent tones.

2. A telephonic answering device according to claim 1, wherein said voice coding means comprises a plurality of switch elements effective to be manually operated by the user for presetting a predetermined code among a multiplicity of possible codes.

3. A telephonic answering device according to claim 1, wherein said tones are generated by an oscillator means effective to provide predetermined frequency tones for remotely driving said telephonic answering device.

4. A telephonic answering device according to claim 1 that further includes a microprocessor unit that discriminates between an effective telephone call wherein a voice sound is detected and a non-effective telephone call wherein no voice sound is detectable to cause said means for driving said message recording means to drive in a reverse direction to the beginning of the receiving of said non-effective call.

5. A telephonic answering device according to claim 4 that further includes a display unit effective to provide a visual indication of the operation modes and/or malfunctions of said telephonic answering device.

* * * * *

UNITED STATES PATENT AND TRADEMARK OFFICE
CERTIFICATE OF CORRECTION

PATENT NO. : 4,302,630

DATED : November 24, 1981

INVENTOR(S) : Alessandro Ingegnoli, Corona Ennio

It is certified that error appears in the above—identified patent and that said Letters Patent is hereby corrected as shown below:

On the Title page, both occurrences
Inventors name has been misspelled (Imgegnoli).

The correct spelling is "INGEGNOLI".

Signed and Sealed this

Ninth Day of February 1982

[SEAL]

Attest:

GERALD J. MOSSINGHOFF

*Attesting Officer*  *Commissioner of Patents and Trademarks*